United States Patent
Michael et al.

(10) Patent No.: US 8,490,124 B2
(45) Date of Patent: Jul. 16, 2013

(54) METHOD AND APPARATUS FOR IMPROVING PERFORMANCE AND USER EXPERIENCE OF A MOBILE BROADCAST RECEIVER

(75) Inventors: Matthew Michael, San Diego, CA (US); Sivaramakrishna Veerepalli, San Diego, CA (US); Shimman Patel, San Diego, CA (US); Tao Li, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 313 days.

(21) Appl. No.: 12/474,057

(22) Filed: May 28, 2009

(65) Prior Publication Data

US 2009/0298418 A1  Dec. 3, 2009

Related U.S. Application Data

(60) Provisional application No. 61/057,082, filed on May 29, 2008.

(51) Int. Cl.
*H04H 60/32* (2008.01)

(52) U.S. Cl.
USPC ......... 725/14; 725/9; 725/34; 725/35; 725/46

(58) Field of Classification Search
USPC .................... 725/9, 14, 34, 35, 46
See application file for complete search history.

(56) References Cited

U.S. PATENT DOCUMENTS

| | | | |
|---|---|---|---|
| 6,359,636 B1 | 3/2002 | Schindler et al. | |
| 7,487,112 B2* | 2/2009 | Barnes, Jr. | 705/26.8 |
| 7,620,967 B2* | 11/2009 | Farineau | 725/46 |
| 7,684,753 B2* | 3/2010 | Ionescu et al. | 455/10 |
| 7,900,229 B2* | 3/2011 | Dureau | 725/46 |

(Continued)

FOREIGN PATENT DOCUMENTS

| | | |
|---|---|---|
| EP | 1631070 | 3/2006 |
| EP | 1657836 | 5/2006 |

(Continued)

OTHER PUBLICATIONS

International Search Report & Written Opinion—PCT/US09/045619—International Search Authority—European Patent Office—Mar. 30, 2010.

(Continued)

*Primary Examiner* — Pankaj Kumar
*Assistant Examiner* — Charles N Hicks
(74) *Attorney, Agent, or Firm* — Heejong Yoo

(57) ABSTRACT

Various techniques for receiving broadcast at a mobile broadcast receiver are described. In an aspect, the broadcast receiver provides user notification and/or automatically launches an application based on user preferences. In another aspect, the broadcast receiver improves channel switching time by predicting future channel selection based on real-time monitoring of user inputs. In another aspect, the broadcast receiver supports drag-and-drop user interface. In another aspect, the broadcast receiver provides additional information associated with a selected broadcast stream. In another aspect, the broadcast receiver processes a broadcast stream and sends output data to an external device for further processing and/or display. In another aspect, the broadcast receiver simultaneously displays live content and stored content. In another aspect, the broadcast receiver simultaneously receives multiple broadcast streams for displayed on one or more display units. In another aspect, the broadcast receiver collects user statistics and sends the statistics to a network entity.

32 Claims, 7 Drawing Sheets

U.S. PATENT DOCUMENTS

| | | |
|---|---|---|
| 2004/0139465 A1 | 7/2004 | Matthews, III |
| 2006/0277577 A1 | 12/2006 | Kiiskinen et al. |
| 2007/0028262 A1 | 2/2007 | Bucher et al. |
| 2007/0107008 A1 | 5/2007 | Dybus |
| 2008/0101765 A1 | 5/2008 | Lee |
| 2008/0271080 A1* | 10/2008 | Gossweiler et al. ............ 725/47 |
| 2009/0042607 A1 | 2/2009 | Adachi et al. |
| 2010/0131969 A1* | 5/2010 | Tidwell et al. ................. 725/14 |

FOREIGN PATENT DOCUMENTS

| | | |
|---|---|---|
| JP | 2002184157 A | 6/2002 |
| KR | 20030056312 A | 7/2003 |
| KR | 20040010963 A | 2/2004 |
| KR | 20040071454 A | 8/2004 |
| KR | 20080004088 A | 1/2008 |
| WO | WO0019662 | 4/2000 |
| WO | WO0223773 | 3/2002 |
| WO | WO02058383 | 7/2002 |
| WO | WO02067447 | 8/2002 |
| WO | WO2007004392 A1 | 1/2007 |
| WO | WO2007024268 A1 | 3/2007 |
| WO | 2007049141 A1 | 5/2007 |
| WO | WO2007086941 | 8/2007 |
| WO | WO2007121790 | 11/2007 |
| WO | WO2008136620 | 11/2008 |

OTHER PUBLICATIONS

Partial International Search Report—PCT/US09/045619—International Search Authority—European Patent Office—Jan. 13, 2010.

* cited by examiner

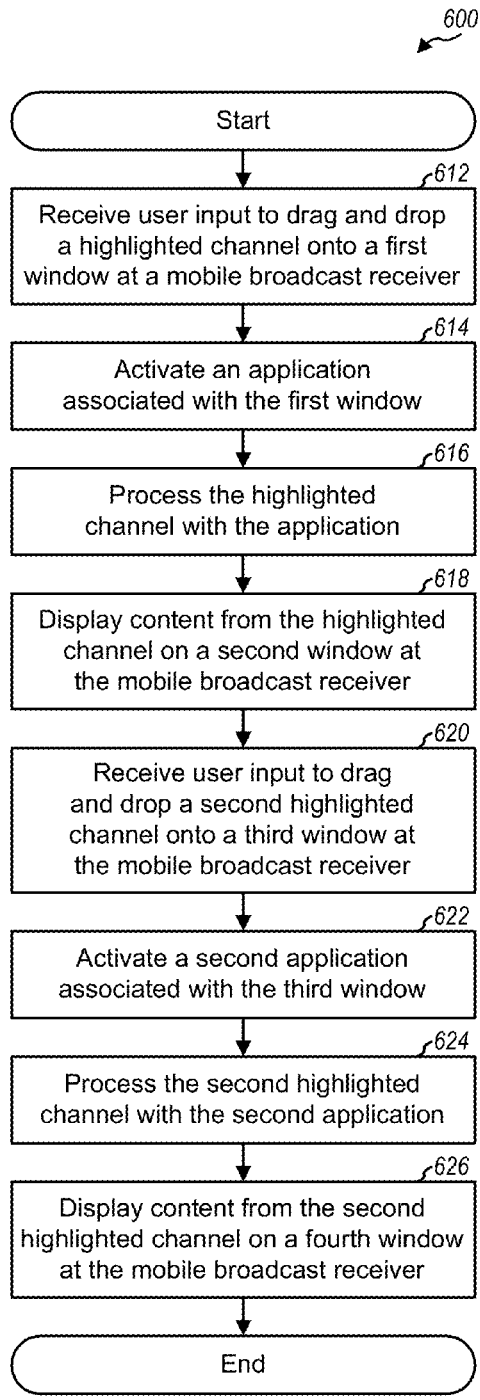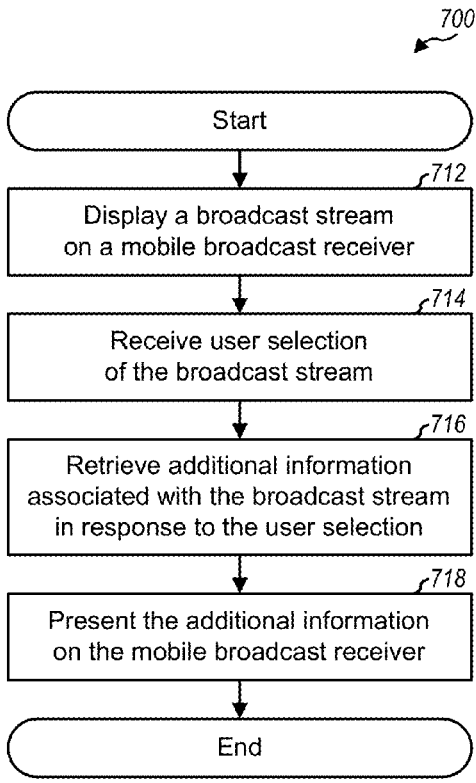
FIG. 6
FIG. 7

METHOD AND APPARATUS FOR IMPROVING PERFORMANCE AND USER EXPERIENCE OF A MOBILE BROADCAST RECEIVER

CLAIM OF PRIORITY UNDER 35 U.S.C. §119

The present Application for Patent claims priority to Provisional Application No. 61/057,082, entitled METHOD AND APPARATUS FOR IMPROVING PERFORMANCE AND USER EXPERIENCE OF A MOBILE BROADCAST RECEIVER, filed May 29, 2008, and assigned to the assignee hereof and hereby expressly incorporated by reference herein.

BACKGROUND

I. Field

The present disclosure relates generally to communication, and more specifically to techniques for receiving broadcast information.

II. Background

A broadcast system may broadcast a number of channels carrying various contents for reception by mobile broadcast receivers. A mobile broadcast receiver is a receiver that is capable of receiving signals from terrestrial and/or satellite broadcast systems and is intended to be carried around by a user (instead of being stationary).

A user operating a mobile broadcast receiver may select a channel or content of interest to the user. Content may be streamed or real time audio/video or data cast content. The mobile broadcast receiver may determine pertinent parameters for the selected channel and then demodulate and decode the channel in accordance with these parameters to obtain decoded data. The mobile broadcast receiver may further process the decoded data to obtain the content sent in the selected channel. The mobile broadcast receiver may continuously process the selected channel and provide the content in a streaming manner as long as the channel is selected for reception.

The mobile broadcast receiver may be a portable device with limited user interface and display capabilities. It may be desirable to improve performance and user experience with such limited capabilities.

SUMMARY

Various techniques for receiving broadcast information at a mobile broadcast receiver are described herein. These techniques may simplify user interaction and/or support more features and flexibility with the limited capabilities of the mobile broadcast receiver.

In an aspect, the mobile broadcast receiver provides user notification and/or automatically launches an application based on user preferences for broadcast contents. In one design, the mobile broadcast receiver receives user selections for different broadcast contents over a period of time, determines user preferences for broadcast contents based on the user selections, and stores the user preferences. The mobile broadcast receiver thereafter monitors incoming broadcast content and provides user notification and/or automatically launches an application based on the incoming broadcast content and the user preferences.

In another aspect, the mobile broadcast receiver improves channel switching time by predicting future channel selection based on real-time monitoring of user inputs/ activity. In one design, the mobile broadcast receiver predicts a channel based on user input (e.g., to highlight a channel), processes the predicted channel prior to selection of the channel, and provides content from the predicted channel if selected by the user.

In another aspect, the mobile broadcast receiver supports a drag-and-drop user interface. In one design, the mobile broadcast receiver receives user input to drag and drop a highlighted channel onto a first window, activates an application associated with the first window, processes the highlighted channel with the application, and displays the content from the highlighted channel on a second window. The size and/or placement of the second window may be determined based on information associated with the first window.

In another aspect, additional information may be associated with a broadcast stream and provided when the broadcast stream is selected. The additional information may comprise product information, promotional information, channel information, etc. In one design, the mobile broadcast receiver displays a broadcast stream, receives user selection of the broadcast stream, retrieves additional information associated with the broadcast stream in response to the user selection, and presents the additional information to the user in the same window or by opening a new display window on the same or different display unit.

In another aspect, the mobile broadcast receiver partially or completely processes a broadcast stream and sends output data to an external device for further processing and/or display. In one design, the output data comprises content from the broadcast stream, and the external device displays the content. In another design, the mobile broadcast receiver demodulates and decodes the broadcast stream to obtain the output data, and the external device decompresses the output data to obtain content from the broadcast stream. The mobile broadcast receiver may also send the output data to one or more additional external devices for processing and/or display, or the mobile broadcast receiver may have more than one display to receive output.

In another aspect, the mobile broadcast receiver simultaneously displays live content and stored content. In one design, the mobile broadcast receiver processes a broadcast stream to obtain live content, receives user selection to display stored content with the live content, retrieves the stored content from memory, and displays the live content and the stored content simultaneously.

In another aspect, the mobile broadcast receiver simultaneously receives multiple broadcast streams, which may be displayed on one or more display units. In one design, the multiple broadcast streams are displayed on one display unit at the mobile broadcast receiver. In another design, a first broadcast stream is displayed on a first display unit at the mobile broadcast receiver, and a second broadcast stream is displayed on a second display unit at an external device. In yet another design, the multiple broadcast streams may be displayed on one display unit at an external device.

In another aspect, the mobile broadcast receiver collects user statistics and sends the collected statistics back to a designated network entity. In one design, the mobile broadcast receiver receives user selections for broadcast contents over a period of time, determines and collects statistics of user viewing habits based on the user selections, and reports the collected statistics to the designated network entity.

Various aspects and features of the disclosure are described in further detail below.

BRIEF DESCRIPTION OF THE DRAWINGS

FIG. 6 shows a process for receiving broadcast with drag-and-drop feature.

FIG. 7 shows a process for receiving broadcast with additional information.

DETAILED DESCRIPTION

The techniques described herein may be used with a variety of broadcast systems and mobile broadcast standards. A few examples of such systems and/or standards include, but are not limited to, MediaFLO™, Digital Video Broadcasting for Handhelds (DVB-H), Digital Video Broadcasting for Satellites (DVB-SH), China Multimedia Mobile Broadcasting (CMMB) and Integrated Services Digital Broadcasting for Terrestrial Television Broadcasting (ISDB-T) systems. MediaFLO™, DVB-H and ISDB-T support digital transmission of multimedia over a terrestrial communication network. MediaFLO™ is described in a document TIA-1099, entitled "Forward Link Only Air Interface Specification for Terrestrial Mobile Multimedia Multicast," dated Aug. 2006. DVB-H is described in a document ETSI EN 300 744, entitled "Digital Video Broadcasting (DVB); Framing Structure, Channel Coding and Modulation for Digital Terrestrial Television," dated Nov. 2004. ISDB-T is described in a document ARIB STD-B31, entitled "Transmission System for Digital Terrestrial Television Broadcasting," dated Jul. 2003. These documents are publicly available.

Figure 1:
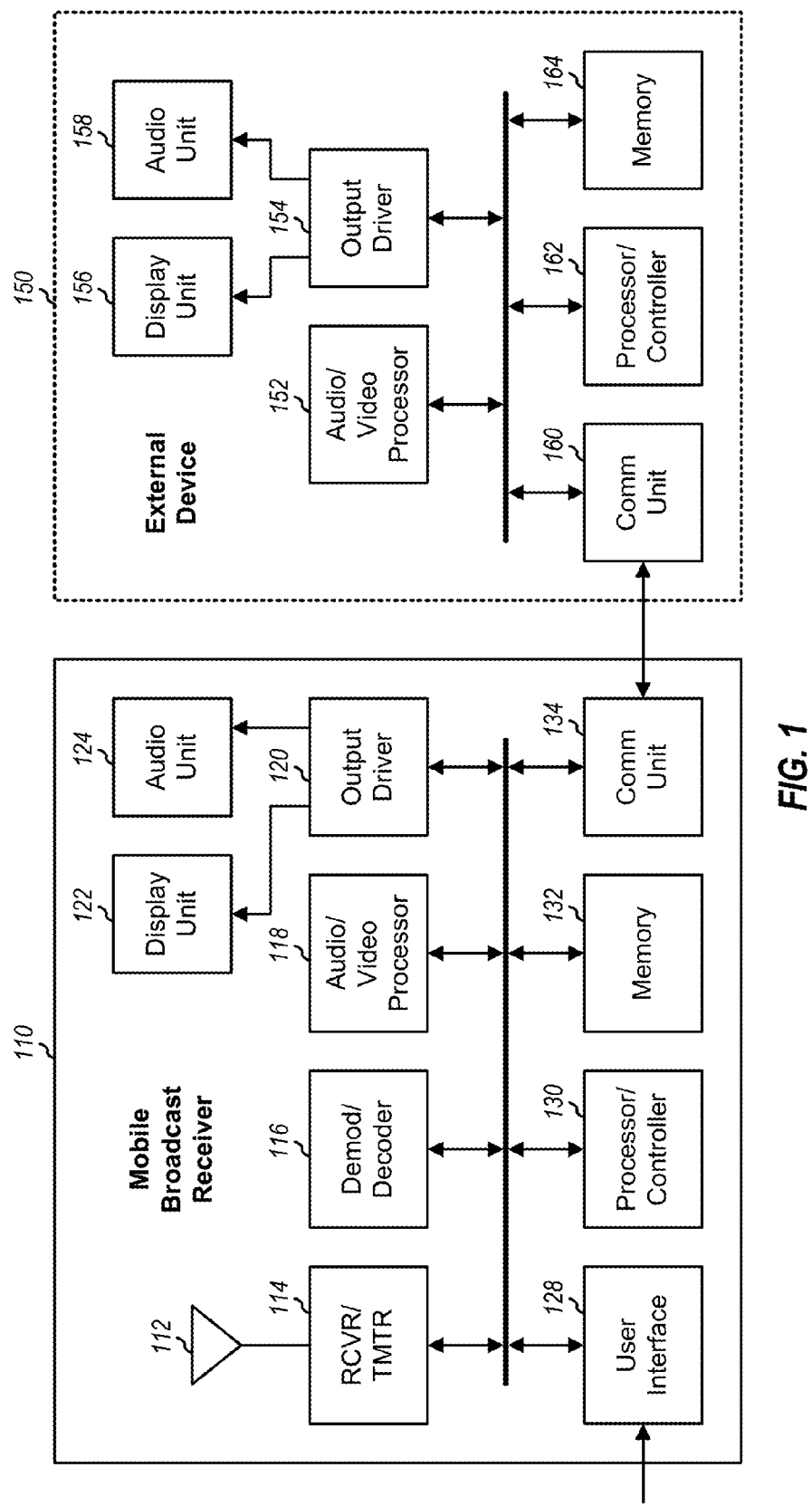
FIG. 1 shows a block diagram of a mobile broadcast receiver.

FIG. 1 shows a block diagram of a design of a mobile broadcast receiver 110, which may be capable of receiving MediaFLO™, DVB-H, ISDB-T and/or other broadcast systems. Mobile broadcast receiver 110 may be a stand-alone receiver or may be part of a cellular telephone, a personal digital assistant (PDA), a wireless communication device, a handheld device, a wireless modem, etc.

Within mobile broadcast receiver 110, an antenna 112 receives signals transmitted by broadcast stations (not shown in FIG. 1) and provides a received signal to a receiver (RCVR) 114. Receiver 114 conditions (e.g., filters, amplifies, frequency downconverts, and digitizes) the received signal and provides samples. A demodulator/decoder (Demod/decoder) 116 demodulates and decodes the samples for a channel of interest and provides decoded data. An audio/video processor 118 decompresses the decoded data and provides content from the channel. The decompression may include video decoding, audio decoding, content decoding, etc., and may also be referred to as decoding, decrypting, etc. An output deriver 120 processes (e.g., converts to analog, filters, and amplifies) the content and generates one or more output signals suitable for presentation on one or more output devices.

The output device(s) may include a display unit 122 (e.g., an LCD screen), an audio unit 124 (e.g., a loudspeaker), and/or other output devices.

A user interface unit 128 receives user inputs via a keypad, a touch screen, and/or other input devices. A controller/processor 130 directs operation at mobile broadcast receiver 110. A memory 132 stores program codes and data used by processing units within mobile broadcast receiver 110. Memory 132 may also store decoded data and/or content from one or more channels, user inputs and selections, user preferences for broadcast contents, etc. A communication (Comm) unit 134 supports communication with other external devices such as an external device 150. Communication unit 134 may support wireline communication (as shown in FIG. 1) and/or wireless communication.

External device 150 may be a laptop computer, a digital television, or some other computing or multimedia device, including a device with limited functionality, such as, for example, an external display device that has no other capabilities. Within external device 150, a video/audio processor 152 decompresses decoded data and provides content. An output driver 154 processes the content from video/audio processor 152 and generates one or more output signals suitable for presentation on a display unit 156 and/or an audio unit 158. A communication unit 160 supports wireline and/or wireless communication with mobile broadcast receiver 110 and/or other devices. A controller/processor 162 directs operation at external device 150. A memory 164 stores program codes and data used by processing units within external device 150 and/or other data.

Mobile broadcast receiver 110 may have limited user interface and display capabilities. Various techniques are described herein to improve performance and user experience with such limited capabilities at mobile broadcast receiver 110.

In one aspect, mobile broadcast receiver 110 maintains a history of user interaction such as user selections of different contents, the time each user selection is made, etc. The different contents may include news, sport scores, stock quotes, weather reports, traffic reports, real-time video streams, real-time audio streams, non-real time video clips, non-real time audio clips, etc. Mobile broadcast receiver 110 may determine user preferences for different contents, the order of preferences for different contents, the preferred viewing times for different contents, etc. based on the history of user interactions. In one design, whenever a user selection is made, mobile broadcast receiver 110 determines the content being selected, the time of the selection, etc. Mobile broadcast receiver 110 then updates the user preferences, e.g., by incrementing a count for the selected content and noting the time of the selection. Mobile broadcast receiver 110 may then determine the user preferences for different contents based on the number of times each type of content is selected.

The user may also explicitly enter the user preferences. For example, the user may enter the types of content preferred by the user, a time window during which each type of content is desired, whether the user desires notification or automatic launch of application for each type of content, etc. Broadcast 110 may store the user preferences entered by the user and/or user preferences learned from user interactions.

Mobile broadcast receiver 110 may receive broadcast information in the background. The broadcast information may contain real-time streaming content intended to be consumed by the user or discarded (and not saved). Mobile broadcast receiver 110 may monitor the incoming content and/or stored program guide data on the mobile broadcast receiver and may notify the user and/or automatically launch an application based on the user preferences. For example, if the incoming content matches one of the user's preferred contents, then mobile broadcast receiver 110 may display an alert of the incoming content on display unit 122, announce an alert of the incoming content on audio unit 124, and/or automatically launch an application associated with the incoming content. The user notification may result in user selection of the incoming content, and mobile broadcast receiver 110 may then process the incoming content as directed by the user. The launched application may start streaming data or a/v content, or prompt a user for input (play, don't play, store to memory, ignore etc.)

Mobile broadcast receiver 110 may notify the user and/or automatically launch an application based on the user preferences all the time. Alternatively, this feature may be enabled only during certain times, e.g., only after work hours.

Figures 2, 4:
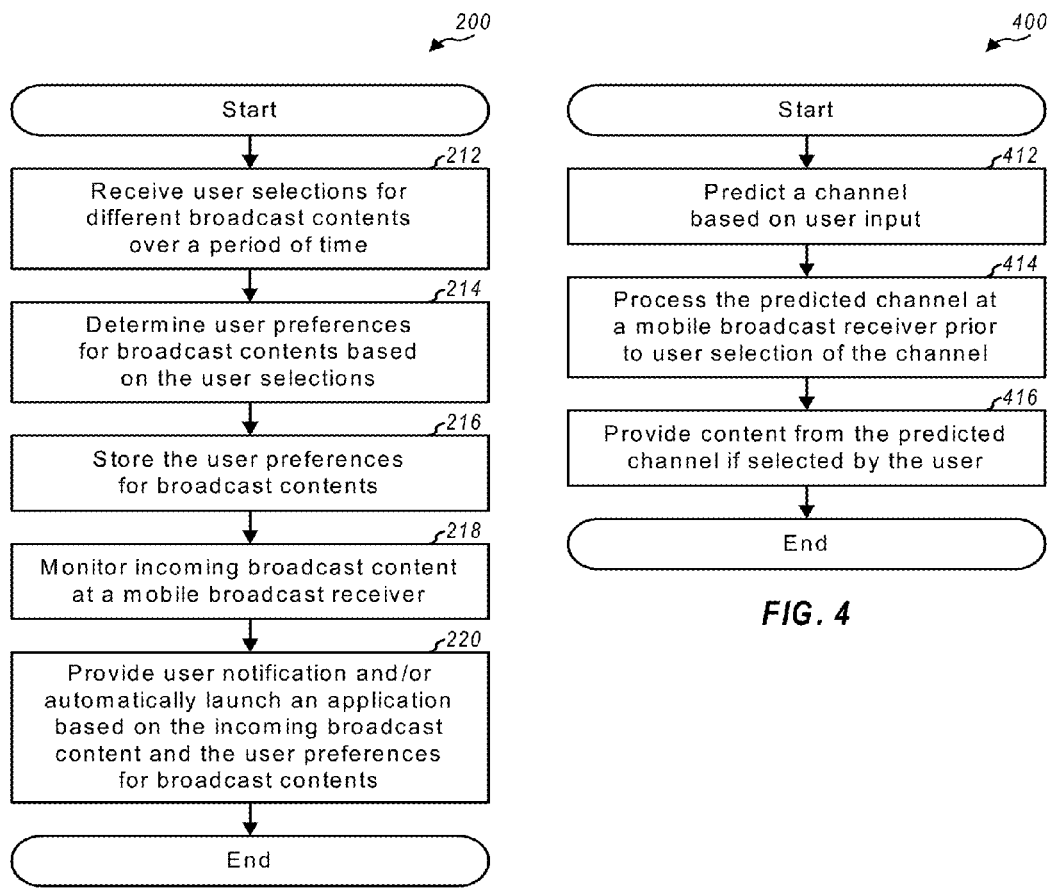
FIG. 2 shows a process for receiving broadcast with user notification and/or automatic application launch.
FIG. 4 shows a process for receiving broadcast with channel prediction.

FIG. 2 shows a design of a process 200 for receiving broadcast information with user notification and/or automatic application launch. Process 200 may be performed by mobile broadcast receiver 110. User selections for different broadcast contents may be received over a period of time (block 212). User preferences for broadcast contents may be determined based on the user selections (block 214). Alternatively or additionally, the user preferences for broadcast contents may be identified based on user inputs. The user preferences for broadcast contents may be stored (block 216). Incoming broadcast content, including but not limited to electronic program guide (EPG) data, associated meta data etc., may be monitored at the mobile broadcast receiver (block 218). The mobile broadcast receiver may provide user notification and/or automatically launch an application based on the incoming broadcast content and the user preferences for broadcast contents, e.g., all the time or only during designated times (block 220).

Whenever the user selects a new channel for reception, mobile broadcast receiver 110 may perform a set of tasks in order to acquire, process, and display the content from the new channel. These tasks may include obtaining pertinent parameters for the new channel, demodulating and decoding the new channel in accordance with the parameters, and decompressing decoded data to obtain the content from the new channel. The amount of time needed to change channel may be relatively long, e.g., over 1 second. Mobile broadcast receiver 110 may freeze the display with the last decoded frame from the old channel or blank the display during the time to acquire and process the new channel. However, freezing or blanking the display may be annoying to the user.

In another aspect, mobile broadcast receiver 110 improves channel switching time by predicting future channel selection based on real-time monitoring of user inputs/activity. Mobile broadcast receiver 110 may predict a channel that might be selected by the user and may demodulate and decode the predicted channel (or portions of the data busts, packets etc.), prior to its selection by the user, in order to achieve faster channel switching.

Figure 3:
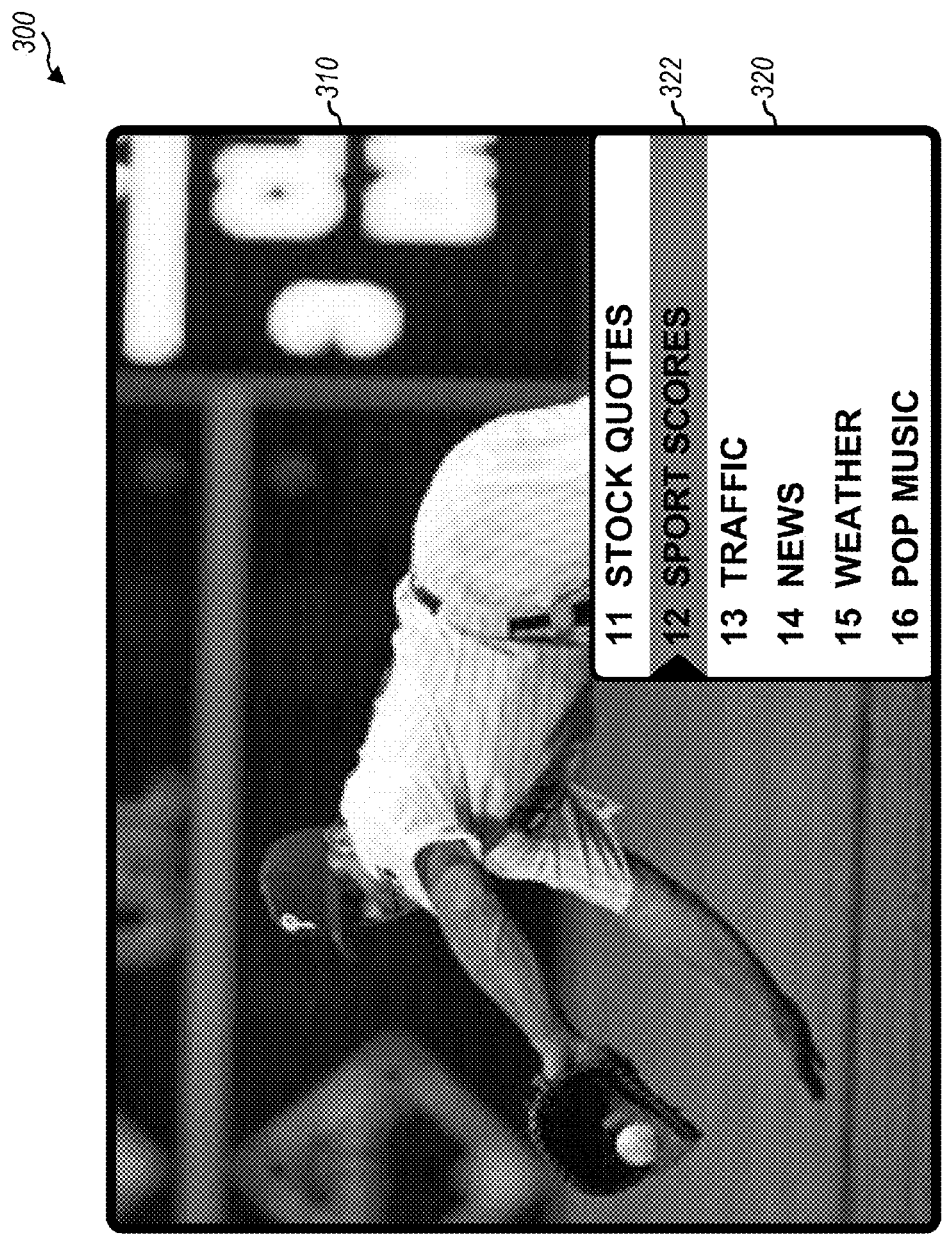
FIG. 3 shows an example display screen at the mobile broadcast receiver.

FIG. 3 shows an example display screen 300 at mobile broadcast receiver 110. In this example, display screen 300 includes a main area 310 and a display window 320. Main area 310 may show content from a currently selected channel, menu, icons, etc. Display window 320 may show an electronics service guide (ESG), which may also be referred to as a program guide, a channel guide, etc. The ESG may list various channels and the content of each channel. In general, display screen 300 may include any number of areas and windows for any type of content.

The user may bring up the ESG at any time by clicking on an appropriate key (e.g., an "ESG" key) on mobile broadcast receiver 110. Mobile broadcast receiver 110 may also automatically bring up the ESG if the user clicks on any one of a designated set of keys, or the ESG may automatically be brought up based on histories, profile, preference etc. (example would be the ESG data shows a program is coming on I might be interested in so the MBR launches the ESG and notifies me of the program with options to watch, record etc.). In any case, mobile broadcast receiver 110 may monitor user navigation through the ESG to predict the next channel selection.

In the example shown in FIG. 3, the ESG displays a listing of channels and their contents. A cursor 322 indicates a channel that is currently highlighted. Cursor 322 moves up and down the ESG in response to user key action. If the user moves the cursor past the top or the bottom of display window 320 (or horizontal like on a TV ESG when scrolling though time), then another section of the ESG may be retrieved and displayed on display window 320.

In one design, mobile broadcast receiver 110 demodulates and decodes the channel/packets/burst that is currently highlighted by the user but which may not have been selected for immediate viewing by the user. The user may scroll through the ESG, and the currently highlighted channel may be determined by a "scroll up" or a "scroll down" command. The user may also enter a specific channel, e.g., via a keypad, and the entered channel may be highlighted. In any case, mobile broadcast receiver 110 may demodulate and decode the currently highlighted channel, prior to its selection, in order to improve channel switching time. Mobile broadcast receiver 110 may be able to more quickly display the channel if and when the channel is selected by the user.

In another design, mobile broadcast receiver 110 may predict future channel selection by the user and demodulates and decodes a channel that might be selected by the user (or may chose to start by opening packets on neighboring channels immediately before and following as I scroll). Mobile broadcast receiver 110 may monitor channel sequences and predict a channel based on information such as the direction of scroll, the speed of scroll, the manner of scroll, etc. Mobile broadcast receiver 110 may determine the predicted channel based on the direction and speed of scroll, and the predicted channel may be in advance of the currently highlighted channel. Mobile broadcast receiver 110 may demodulate and decode the predicted channel for possible display if the channel is selected by the user. The user may continuously press the "scroll up" button if the user is trying to reach a specific channel that is relatively far from the current channel. In this case, mobile broadcast receiver 110 may ignore the rapidly changing highlighted channels, until the "scroll up" button is released, and may then demodulate and decode the highlighted channel after the release of the button.

The user may click on the "scroll up" button at a somewhat periodic rate to surf channels. In this case, mobile broadcast receiver 110 may process and display each highlighted channel for which sufficient time is given to perform these tasks. Mobile broadcast receiver 110 may also process one or more channels ahead of the currently highlighted channel (if resources are available) in anticipation of the user navigating in this direction. For example, if four channels 1, 2, 3 and 4 are ordered from 1 through 4, when mobile broadcast receiver 110 may start acquiring channels 2 and 3 upon receiving a channel up while on channel 1. Mobile broadcast receiver 110 may abandon channel 2 and start acquiring channels 3 and 4 upon receiving a channel up while on channel 2. Mobile broadcast receiver 110 may also start acquiring multiple channels in multiple directions (e.g., in opposite directions of a channel scroll). Alternatively, the mobile broadcast receiver may be configured to open packets on neighboring channels that immediately precede and follow the channel of focus while the channels are scrolled.

Mobile broadcast receiver 110 may also predict a channel based on other information such as the user history or preference, the content on each channel, etc. Mobile broadcast receiver 110 may demodulate and decode a predicted channel if its content matches one of the contents preferred by the user.

FIG. 4 shows a design of a process 400 for receiving broadcast information with channel prediction. Process 400 may be performed by mobile broadcast receiver 110. A channel may be predicted based on user input (block 412). In one design, user input highlighting a channel may be received, and the highlighted channel or a channel ahead of the highlighted channel may be selected as the predicted channel. In another design, user preferences may be determined based on user inputs over a period of time, and a channel having content matching the user preferences may be selected as the predicted channel. The predicted channel may be processed at the mobile broadcast receiver prior to user selection of the channel (block 414). Content from the predicted channel may be provided if selected by the user (block 416).

In another aspect, mobile broadcast receiver 110 supports a drag-and-drop user interface. This user interface may simplify user interaction and/or support more features and flexibility.

Figure 5:
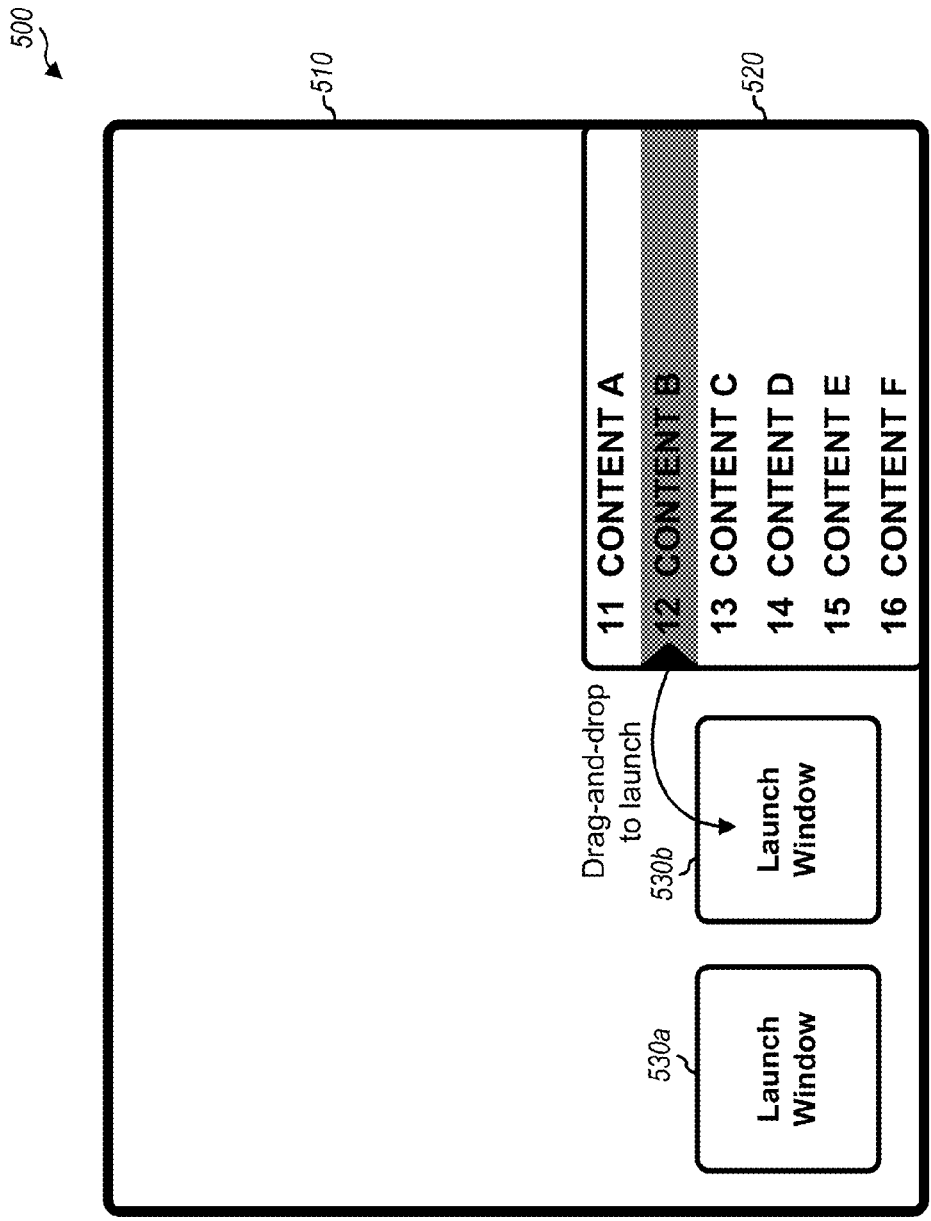
FIG. 5 shows an example display screen supporting drag-and-drop user interface.

FIG. 5 shows an example display screen 500 that supports a drag-and-drop user interface. In this example, display screen 500 includes a main area 510, a display window 520, and launch windows 530*a* and 530*b*. Main area 510 may show content from a selected channel, menu, icons, etc. Display window 520 may show channels from an ESG. Launch windows 530*a* and 530*b* may be used to launch video/audio/data (e.g., stock quotes or other streaming data) applications. Each launch window 530 may be associated with a specific video/audio/data application, a specific display area within main area 510, a specific display mode, etc.

The user may highlight a channel within display window 520 and may drag and drop the highlighted channel onto main display 510 (or onto one of a first main display 510*a*, second main display 510*b*. etc. if the mobile broadcast receiver has multiple displays—not illustrated) causing the mobile broadcast receiver to launch a new window 530*a* or 530b. Mobile broadcast receiver 110 may then launch the application associated with the launch window 530*a* or 530*b* onto which the highlighted channel is dropped. The highlighted channel may then be processed and displayed in a display window associated with the selected launch window.

The user may highlight another channel and drag and drop the highlighted channel onto main display 510 causing another launch window. Mobile broadcast receiver 110 may then launch the application associated with this launch window. The highlighted channel may then be processed and displayed in a display window associated with this launch window. Multiple channels may be displayed concurrently on side-by-side display windows or with picture-in-picture.

FIG. 6 shows a design of a process 600 for receiving broadcast information with drag-and-drop feature. Process 600 may be performed by mobile broadcast receiver 110. User input to drag and drop a highlighted channel onto a first window at the mobile broadcast receiver may be received (block 612). The highlighted channel may be dragged from a window displaying an electronics service guide. An application associated with the first window may be activated (block 614). The highlighted channel may be processed with the application (block 616). Content from the highlighted channel may be displayed on a second window at the mobile broadcast receiver (block 618). The size and/or placement of the second window may be determined based on information associated with the first window, or alternatively, the second window size and/or placement may be user defined.

User input to drag and drop a second highlighted channel onto a third window at the mobile broadcast receiver may be received (block 620). A second application associated with the third window may be activated (block 622). The second highlighted channel may be processed with the second application (block 624). Content from the second highlighted channel may be displayed on a fourth window at the mobile broadcast receiver (block 626). The second and fourth windows for the two highlighted channels may be non-overlapping and displayed side-by-side. Alternatively, the second and fourth windows may be overlapping and displayed with picture-in-picture.

In another aspect, additional information may be associated with a broadcast stream. The additional information may comprise product information, promotional information, program/channel information, etc. The additional information may be sent inband within the broadcast stream, received previously and stored on mobile broadcast receiver 110, or downloaded as needed. A reverse link (or uplink) may be set up to send a request for the additional information, which may then be sent on the forward link (or downlink) in response to the request.

The user may select the broadcast stream, e.g., with a pointing device. An application may be launched in response to the user selection. The application may retrieve the additional information associated with the broadcast stream and present the additional information to the user. The additional information may be presented in the same window or in a different window. The user may also drag and drop a data stream onto display 510 and a new dedicated window will open for just that data stream.

FIG. 7 shows a design of a process 700 for receiving broadcast information with additional information. Process 700 may be performed by mobile broadcast receiver 110. A broadcast stream may be displayed on the mobile broadcast receiver (block 712). User selection of the broadcast stream may be received (block 714). Additional information associated with the broadcast stream may be retrieved in response to the user selection (block 716). For block 716, the additional information may be sent inband in the broadcast stream and may be retrieved from the broadcast stream. The additional information may also be stored at the mobile broadcast receiver prior to the user selection of the broadcast stream. The additional information may also be downloaded in response to receiving the user selection of the broadcast stream. The additional information may comprise information for a product presented by the broadcast stream, promotional information for the product, program/channel information for the broadcast stream, some other information, or a combination thereof. The additional information may be presented on the mobile broadcast receiver (block 718).

In another aspect, mobile broadcast receiver 110 demodulates and decodes a broadcast stream and sends the content to external device 150. External device 150 may display the content on display unit 156. Mobile broadcast receiver 110 may be a handheld device (e.g., a cellular phone) with a relatively small display unit 122. External device 150 may be a larger device (e.g., a laptop computer or a digital television) having a larger and/or higher resolution display unit 156. Displaying the content on a larger display unit 156 may improve user viewing of the broadcast stream.

In another aspect, mobile broadcast receiver 110 partially processes a broadcast stream, and external device 150 completes the processing of the broadcast stream. This receiver architecture may provide additional broadcast portability and user flexibility A broadcast receiver chain may include various functions such as, e.g., channel demodulation, channel decoding, video/audio decompression, protocol layer processing, etc. These various functions may be performed by a single device such as mobile broadcast receiver 110. Alternatively, multiple devices may perform the functions in the broadcast receiver chain, which may provide additional user portability and flexibility for receiving a broadcast stream (e.g., a video/audio stream) in a mobile environment. One device (e.g., mobile broadcast receiver 110) may perform physical layer receiver functions such as channel demodulation and channel decoding. Another device (external device 150) may perform video/audio decompression and protocol layer processing and may also provide display functionality.

In general, the functions in the broadcast receiver chain may be partitioned among multiple devices in various manners. The partitioning of the receiver functions among different devices may be based on various factors such as:
  Processing power—mobile broadcast receiver 110 may perform tasks that require less processing power and improve power efficiency,
  Mobility—mobile broadcast receiver 110 may have a smaller form factor to improve mobility, and
  Security—mobile broadcast receiver 110 may include decryption functionality so that the user can take histogram/her broadcast service subscription with him/her and can receive contents covered by the broadcast service subscription on more than one external device.

In another aspect, mobile broadcast receiver 110 receives and processes one or more broadcast streams and sends output data (e.g., decoded data or content) for the one or more broadcast streams to multiple external devices at the same time or at different times. The communication link between mobile broadcast receiver 110 and the external devices may be wireless link (e.g., IEEE 802.11, Bluetooth, etc.) and/or wireline link (e.g., LAN). The transmission from mobile broadcast receiver 110 may be either point-to-point or multicast and may be within a wireless or wireline network. Mobile broadcast receiver 110 may send the same output data to all external devices. Alternatively, mobile broadcast receiver 110 may send different output data to different external devices.

An external device may receive content that is ready for presentation on a display unit within that external device. Alternatively, an external device may receive decoded data from mobile broadcast receiver 110 and may perform decompression and/or other processing on the decoded data to obtain content suitable for presentation on a display unit. Mobile broadcast receiver 110 can act as a multicast server in which the user can select various contents that may be displayed on one or multiple devices at a selected time.

Figure 8:
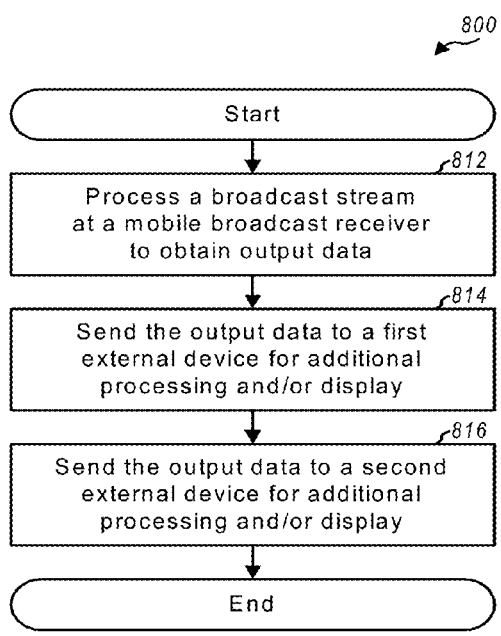
FIG. 8 shows a process for receiving a broadcast stream with multiple devices.

FIG. 8 shows a design of a process 800 for processing and displaying a broadcast stream with multiple devices. A broadcast stream may be processed at a mobile broadcast receiver to obtain output data (block 812). The output data may be sent to a first external device for additional processing and/or display (block 814). In one design, the output data comprises content from the broadcast stream, and the first external device displays the content. In another design, the mobile broadcast receiver demodulates and decodes the broadcast stream to obtain the output data, and the first external device decompresses the output data to obtain content from the broadcast stream. The output data may thus comprise (i) content suitable for display or (ii) intermediate/decoded data to be further processed by the first external device to obtain the content suitable for display.

The output data may be sent to a second external device for additional processing and/or display (block 816). The output data may be sent simultaneously to the first and second external devices via multicast transmission. Alternatively, the output data may be sent separately to the first and second external devices via point-to-point transmission.

In another aspect, mobile broadcast receiver 110 simultaneously displays live content and stored content on display unit 122, or on one or more of display units 122*a*, 122*b*, etc., (not illustrated) if the mobile broadcast receiver has multiple displays. Mobile broadcast receiver 110 may decode a channel selected by the user and store the content from the selected channel in memory 132, e.g., as directed by the user. Thereafter, mobile broadcast receiver 110 may process a channel selected by the user and obtain live content from the selected channel. Mobile broadcast receiver 110 may display the live content along with the stored content (e.g., in response to user selection) on display unit 122. The live content and the stored content may be received from the same channel at different times or may be received from different channels.

Figure 9:
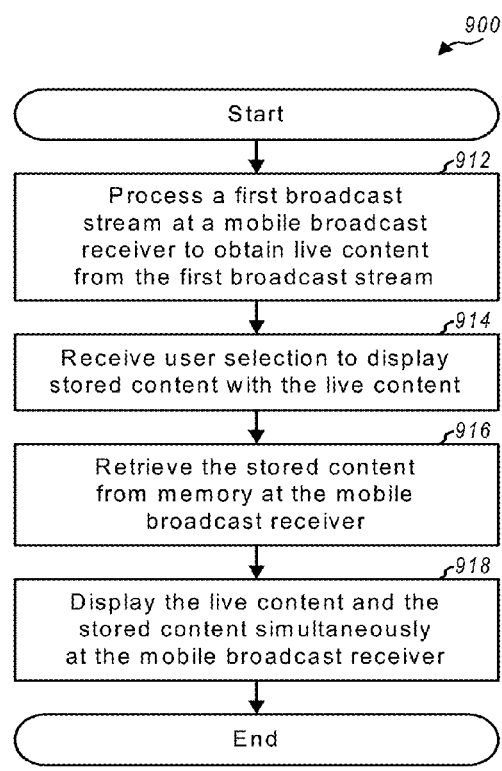
FIG. 9 shows a process for displaying live content and stored content.

FIG. 9 shows a design of a process 900 for simultaneously displaying live content and stored content. Process 900 may be performed by mobile broadcast receiver 110. A first broadcast stream may be processed at the mobile broadcast receiver to obtain live content from the first broadcast stream (block 912). User selection to display stored content with the live content may be received (block 914). The stored content may then be retrieved from memory at the mobile broadcast receiver (block 916). Prior to processing the first broadcast stream, another broadcast stream may be processed at the mobile broadcast receiver, and the content from this broadcast stream may be stored in the memory. The stored content may also be other content obtained in other manners. In any case, the live content and the stored content may be displayed simultaneously at the mobile broadcast receiver (block 918).

In another aspect, mobile broadcast receiver 110 simultaneously receives and processes multiple broadcast streams, which may be displayed on one or more display units. In one design, multiple broadcast streams may be presented on display unit 122 at mobile broadcast receiver 110. In another design, one broadcast stream may be presented on display unit 122 at mobile broadcast receiver 110, and another broadcast stream may be presented on display unit 156 at external device 150. In yet another design, multiple broadcast streams may be presented on display unit 156 at external device 150. In general, any number of broadcast streams may be received simultaneously and presented on any number of display units.

Figure 10:
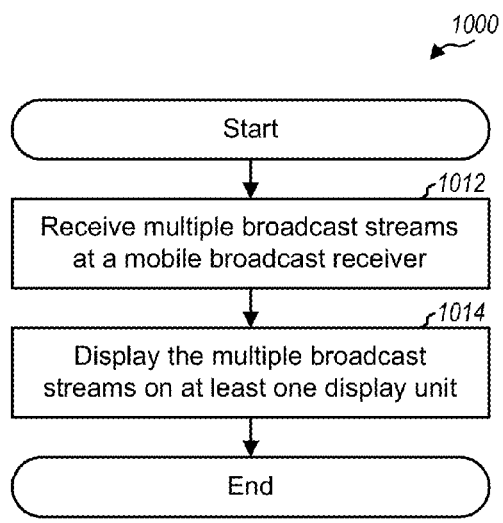
FIG. 10 shows a process for receiving multiple broadcast streams.

FIG. 10 shows a design of a process 1000 for simultaneously receiving and displaying multiple broadcast streams. Multiple broadcast streams may be received at a mobile broadcast receiver (block 1012). The multiple broadcast streams may be displayed on at least one display unit (block 1014). In one design, the multiple broadcast streams are displayed on one display unit at the mobile broadcast receiver. In another design, the broadcast streams may be displayed on multiple display units at the mobile broadcast unit. In another design, a first broadcast stream may be displayed on a first display unit at the mobile broadcast receiver, and a second broadcast stream may be displayed on a second display unit at an external device. In yet another design, the multiple broadcast streams may be displayed on one display unit at an external device.

In another aspect, mobile broadcast receiver 110 collects user statistics and sends the collected statistics back to a designated network entity, e.g., a content provider, a network operator, etc. The collected statistics may be for viewing habits of the user and may include information such as the type of content watched, the frequency of content retrieval, the time of content retrieval, the location of content retrieval, etc. The collected statistics may be reported when initiated by the user, the content provider, the network operator, or some other entity. When reporting is initiated, the collected statistics may be processed by processor/controller 130, conditioned by transmitter (TMTR) 114, and send via the reverse link to the designated network entity. The reverse link may be a wireless link (as shown in FIG. 1) or a wireline link. The collected statistics may be used to select contents to send in the future, to select the time when contents are sent, and/or for other purposes.

Figure 11:
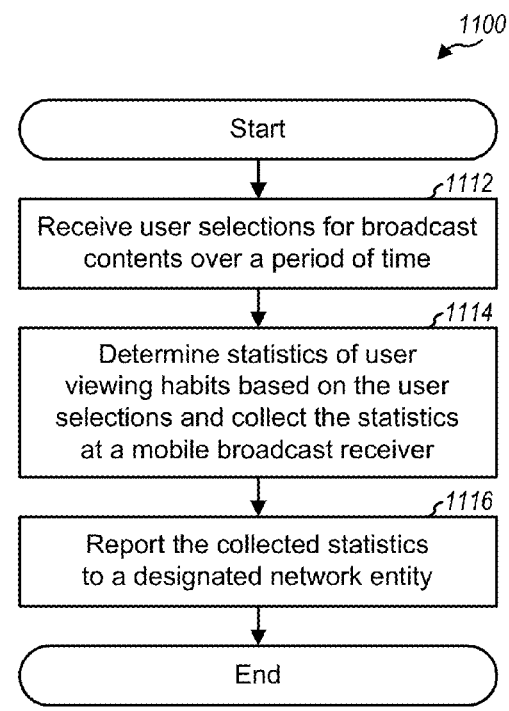
FIG. 11 shows a process for collecting and reporting user statistics.

FIG. 11 shows a design of a process 1100 for collecting and reporting user statistics. Process 1100 may be performed by mobile broadcast receiver 110. User selections for broadcast contents may be received over a period of time (block 1112). Statistics of user viewing habits may be determined based on the user selections and collected at the mobile broadcast receiver (block 1114). The collected statistics may comprise the type of content watched, the frequency of content retrieval, the time of content retrieval, the location of content retrieval, some other information, or a combination thereof. The collected statistics may be reported (e.g., sent via a reverse link in a cellular system) to a designated network entity (block 1116).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinatios of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method of receiving broadcast information, comprising:
  storing, at a mobile broadcast receiver, user preferences for broadcast contents;
  monitoring incoming broadcast content at the mobile broadcast receiver; and
  automatically launching an application, by the mobile broadcast receiver, based on the incoming broadcast content and the user preferences for broadcast contents, and updating the user preferences by incrementing a count for the broadcast contents.

2. The method of claim 1, further comprising:
receiving user selections for different broadcast contents over a period of time; and
determining the user preferences for broadcast contents based on the user selections.

3. The method of claim 1, further comprising:
receiving user inputs identifying the user preferences for broadcast contents.

4. The method of claim 1, wherein the automatically launching an application comprises providing user notification or automatically launching an application only during designated times.

5. A mobile broadcast receiver, comprising:
a memory configured to store user preferences for broadcast contents; and
at least one processor configured:
to monitor incoming broadcast content and
to automatically launch an application, by the mobile broadcast receiver, based on the incoming broadcast content and the user preferences for broadcast contents, and updating the user preferences by incrementing a count for the broadcast contents.

6. The mobile broadcast receiver of claim 5, wherein the at least one processor is configured to:
receive user selections for different broadcast contents over a period of time, and
determine the user preferences for broadcast contents based on the user selections.

7. The mobile broadcast receiver of claim 5, wherein the at least one processor is configured to receive user inputs identifying the user preferences for broadcast contents.

8. An apparatus for receiving broadcast information, comprising:
means for storing, at a mobile broadcast receiver, user preferences for broadcast contents;
means for monitoring incoming broadcast content at the mobile broadcast receiver; and
means for automatically launching an application, by the mobile broadcast receiver, based on the incoming broadcast content and the user preferences for broadcast contents, and updating the user preferences by incrementing a count for the broadcast contents.

9. The apparatus of claim 8, further comprising:
means for receiving user selections for different broadcast contents over a period of time; and
means for determining the user preferences for broadcast contents based on the user selections.

10. The apparatus of claim 8, further comprising:
means for receiving user inputs identifying the user preferences for broadcast contents.

11. A computer program product, comprising:
a non-transitory computer-readable medium comprising:
code for causing a mobile broadcast receiver to store user preferences for broadcast contents;
code for causing the mobile broadcast receiver to monitor incoming broadcast content at the mobile broadcast receiver; and
code for causing the mobile broadcast receiver to automatically launch an application based on the incoming broadcast content and the user preferences for broadcast contents, and updating the user preferences by incrementing a count for the broadcast contents.

12. The computer program product of claim 11, the computer-readable medium further comprising:
code for causing the mobile broadcast receiver to receive user selections for different broadcast contents over a period of time; and
code for causing the mobile broadcast receiver to determine the user preferences for broadcast contents based on the user selections.

13. A method of receiving broadcast information, comprising:
predicting a channel based on user input;
demodulating and decoding the predicted channel at a mobile broadcast receiver prior to user selection of the channel; and
providing content from the predicted channel if selected.

14. The method of claim 13, wherein the predicting a channel based on user input comprises:
receiving user input highlighting a channel, and
selecting either the highlighted channel as the predicted channel or a channel ahead of the highlighted channel as the predicted channel.

15. The method of claim 13, wherein the predicting a channel based on user input comprises:
determining user preferences based on user inputs over a period of time, and
selecting a channel having content matching the user preferences as the predicted channel.

16. The method of claim 13, wherein the providing content comprises:
displaying a broadcast stream on a mobile broadcast receiver;
receiving user selection of the broadcast stream; and
retrieving, by the mobile broadcast receiver, additional information associated with the broadcast stream in response to the user selection.

17. The method of claim 16, wherein the additional information retrieved in response to the user selection corresponds to one of:
additional information that is sent inband as part of the broadcast stream, and wherein the step of retrieving the additional information comprises retrieving the additional information from the broadcast stream; and
additional information that is retrieved out of band in response to the user selecting a link that is sent inband as part of the broadcast stream, wherein the additional information retrieved out of band is then presented in either a same window as the broadcast stream or in another window.

18. The method of claim 16, further comprising:
storing the additional information at the mobile broadcast receiver prior to the user selection of the broadcast stream.

19. The method of claim 16, wherein the retrieving the additional information comprises downloading the additional information in response to receiving the user selection of the broadcast stream.

20. The method of claim 16, wherein the additional information comprises information for a product presented by the broadcast stream, promotional information for the product, program information for the broadcast stream, or a combination thereof.

21. An apparatus for a mobile broadcast receiver, comprising:
at least one processor configured to:
predict a channel based on user input,
demodulate and decode the predicted channel prior to user selection of the channel, and
provide content from the predicted channel if selected.

22. The apparatus of claim 21, wherein the at least one processor is further configured to:
  receive user input highlighting a channel, and
  select either the highlighted channel as the predicted channel or a channel ahead of the highlighted channel as the predicted channel.

23. The apparatus of claim 21, wherein the at least one processor is further configured to:
  determine user preferences based on user inputs over a period of time, and
  select a channel having content matching the user preferences as the predicted channel.

24. The apparatus of claim 21, wherein the at least one processor is further configured to:
  provide a broadcast stream for display,
  receive user selection of the broadcast stream, and
  retrieve, by the mobile broadcast receiver, additional information associated with the broadcast stream in response to the user selection.

25. The apparatus of claim 24, wherein the additional information is sent inband in the broadcast stream, and wherein the at least one processor is configured to retrieve the additional information from the broadcast stream.

26. The apparatus of claim 24, wherein the at least one processor is configured to download the additional information in response to receiving the user selection of the broadcast stream.

27. A method of receiving broadcast information, comprising:
  processing a first broadcast stream at a mobile broadcast receiver to obtain live content from the first broadcast stream;
  retrieving stored broadcast content from memory at the mobile broadcast receiver; and
  displaying the live content and the stored broadcast content simultaneously, wherein at least one of the live content and stored content is displayed at an external display device.

28. The method of claim 27, further comprising:
  processing a second broadcast stream at the mobile broadcast receiver; and
  storing content from the second broadcast stream in the memory for use later to display with live content.

29. The method of claim 27, further comprising:
  receiving user selection to display the stored content with the live content, and
  wherein the stored content is retrieved and displayed in response to the user selection.

30. An apparatus for a mobile broadcast receiver, comprising:
  a memory to store content for display when selected; and
  at least one processor configured to:
    process a first broadcast stream to obtain live content from the first broadcast stream,
    retrieve stored broadcast content from the memory, and
    provide the live content and the stored broadcast content for simultaneous display, wherein at least one of the live content and stored content is displayed at an external display device.

31. The apparatus of claim 30, wherein the at least one processor is configured to process a second broadcast stream, and
  wherein the memory is configured to store content from the second broadcast stream for use later to display with live content.

32. The apparatus of claim 30, wherein the at least one processor is configured to:
  receive user selection to display the stored content with the live content, and
  retrieve the stored content in response to the user selection.

* * * * *